(12) United States Patent
Kim et al.

(10) Patent No.: US 10,762,888 B2
(45) Date of Patent: *Sep. 1, 2020

(54) SOUND ABSORBING FABRIC WITH IMPROVED THERMAL INSULATION AND METHOD OF MANUFACTURING THE SAME

(71) Applicants: Hyundai Motor Company, Seoul (KR); Kia Motors Corporation, Seoul (KR)

(72) Inventors: Keun Young Kim, Suwon-si (KR); Oh Deok Kwon, Hwaseong-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 337 days.

This patent is subject to a terminal disclaimer.

(21) Appl. No.: 15/804,971

(22) Filed: Nov. 6, 2017

(65) Prior Publication Data
US 2018/0233121 A1   Aug. 16, 2018

(30) Foreign Application Priority Data
Feb. 13, 2017   (KR) .................. 10-2017-0019171

(51) Int. Cl.
*G10K 11/162* (2006.01)
*G10K 11/165* (2006.01)
(Continued)

(52) U.S. Cl.
CPC .......... *G10K 11/162* (2013.01); *C03C 25/007* (2013.01); *C03C 25/47* (2018.01);
(Continued)

(58) Field of Classification Search
CPC .... G10K 11/162; G10K 11/165; C03C 25/47; C03C 25/007; C03C 2218/111;
(Continued)

(56) References Cited

U.S. PATENT DOCUMENTS 8,439,161 B2 * 5/2013 Bliton .................. D04H 1/4218
181/286
10,137,666 B2 * 11/2018 Kim ........................ B32B 5/022
2012/0247868 A1 * 10/2012 Kato .................... H05K 9/0084
181/284

FOREIGN PATENT DOCUMENTS

KR   10-2010-0002566 A   1/2010
KR   10-2012-0023707 A   3/2012
(Continued)

*Primary Examiner* — Forrest M Phillips
(74) *Attorney, Agent, or Firm* — Morgan, Lewis & Bockius LLP (57) ABSTRACT

Disclosed are a sound absorbing fabric with improved thermal insulation, and a method of manufacturing the same, wherein an inorganic aerogel powder and a thermosetting binder resin are impregnated into a non-woven fabric made of a heat-resistant fiber, wherein the inorganic aerogel powder has a surface modified by a surfactant to be uniformly mixed with and dispersed in a binder resin, thereby forming the sufficient number of micro cavities inside the non-woven fabric and increasing dispersibility of the inorganic aerogel powder, and thus heat resistance, sound absorbing and sound insulating properties, and thermal insulation properties can be significantly improved.

32 Claims, 2 Drawing Sheets

(A) BEFORE IMPREGNATION (B) AFTER IMPREGNATION (51) Int. Cl.
*D04H 1/4318* (2012.01)
*C03C 25/47* (2018.01)
*D04H 1/488* (2012.01)
*D04H 1/413* (2012.01)
*D04H 1/58* (2012.01)
*D06N 3/00* (2006.01)
*D04H 1/4342* (2012.01)
*D06N 3/12* (2006.01)
*C03C 25/007* (2018.01)
*D04H 1/732* (2012.01)
*D06M 11/79* (2006.01)

(52) U.S. Cl.
CPC ........... *D04H 1/413* (2013.01); *D04H 1/4318* (2013.01); *D04H 1/4342* (2013.01); *D04H 1/488* (2013.01); *D04H 1/58* (2013.01); *D04H 1/732* (2013.01); *D06M 11/79* (2013.01); *D06N 3/0011* (2013.01); *D06N 3/0063* (2013.01); *D06N 3/12* (2013.01); *G10K 11/165* (2013.01); *C03C 2218/111* (2013.01); *D06N 2201/029* (2013.01); *D06N 2201/0272* (2013.01); *D06N 2209/025* (2013.01); *D06N 2209/065* (2013.01); *D10B 2331/021* (2013.01); *D10B 2505/12* (2013.01)

(58) Field of Classification Search
CPC .... D04H 1/413; D04H 1/4318; D04H 1/4342; D04H 1/488; D04H 1/58; D04H 1/732; D06M 11/79; D06N 3/0011; D06N 3/0063; D06N 3/12; D06N 2201/0272; D06N 2201/029; D10B 2331/021; D10B 2505/12
USPC .......................................................... 181/286
See application file for complete search history.

(56) References Cited

FOREIGN PATENT DOCUMENTS

| | | |
|---|---|---|
| KR | 10-2012-0043329 A | 5/2012 |
| KR | 10-1176137 B1 | 8/2012 |
| KR | 10-2012-0122797 A | 11/2012 |
| KR | 10-2013-0142962 A | 12/2013 |
| KR | 10-2014-0037512 | 3/2014 |
| KR | 10-1485784 B1 | 1/2015 |
| KR | 10-1515803 B1 | 5/2015 |

* cited by examiner (A) BEFORE IMPREGNATION

FIG. 1A

(B) AFTER IMPREGNATION

SOUND ABSORBING FABRIC WITH IMPROVED THERMAL INSULATION AND METHOD OF MANUFACTURING THE SAME

CROSS REFERENCE TO RELATED APPLICATION

The present application claims priority to Korean Patent Application No. 10-2017-0019171, filed Feb. 13, 2017, the entire contents of which is incorporated herein for all purposes by this reference.

BACKGROUND OF THE INVENTION

Field of the Invention

The present invention relates to a sound absorbing fabric with improved thermal insulation and a method of manufacturing the same. More particularly, the present invention relates to a sound absorbing fabric with improved thermal insulation and a method of manufacturing the same, wherein an inorganic aerogel powder and a thermosetting binder resin are impregnated into a non-woven fabric made of a heat-resistant fiber such that the inorganic aerogel powder has a surface modified by a surfactant to be uniformly mixed and dispersed in a binder resin, thereby forming the sufficient number of micro cavities inside the non-woven fabric and increasing dispersibility of the inorganic aerogel powder, and thus heat resistance, sound absorbing and sound insulating properties, and thermal insulation properties can be significantly improved.

Description of Related Art

With industrial development, unwanted noise is generated and this noise may be disturbing to people. Accordingly, various noise-control measures have been proposed. In an effort to control noise, research on the development of new sound absorbing materials that can absorb sound or insulate from sound has been conducted in various ways.

Representative products in various industrial fields requiring sound absorbing materials include: electric appliances such as air conditioners, refrigerators, washing machines, lawn mowers, etc.; transportation devices such as automobiles, ships, aircrafts, etc.; construction materials such as wall materials, flooring materials, etc., and so forth. In addition, there is a growing demand for improvement of insulation properties for energy efficiency enhancement and preservation according to environmental problems. The sound absorbing materials and thermal insulating materials are required in a vehicle and other industrial fields. In general, in the case of sound absorbing materials, which are applied in industrial fields, weight reduction, flame retardancy, heat resistance, and thermal insulation properties are additionally required besides sound absorbing properties, depending on the application. In particular, sound absorbing materials applied to a vehicle engine or an exhaust system, etc. maintained a high temperature of 200° C. or above may be required to have heat resistance, flame retardancy, and thermal insulation properties. At present, aramid fibers are gaining attention as sound-absorbing materials having excellent heat resistance.

In addition, research is being conducted to provide functionalities such as flame retardancy, water repellency, and thermal insulation properties to a non-woven sound absorbing fabric. Conventionally, a functional skin material layer is laminated on one side of a non-woven fabric. However, in the case of laminating the skin material layer, the overall process is complicated because a hot pressing process for integrating the non-woven fabric layer and the skin layer is necessary. In addition, flame retardants and water repellents, which are included as additives in the skin material layer, may lead to production of toxic gas as a result of combustion during the hot pressing process. Moreover, deformation of the internal structure of the non-woven fabric that may occur during the hot pressing process can lead to deterioration of sound-absorbing properties.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a sound absorbing fabric of an organic-inorganic composite material having excellent heat resistance, sound absorbing properties, and thermal insulation properties wherein an inorganic aerogel powder, namely a silica aerogel powder having a modified surface, and a thermosetting binder resin are simultaneously impregnated into a non-woven fabric made of a heat-resistant fiber to prepare a sound absorbing fabric. In other words, the silica aerogel powder and the thermosetting binder resin are dispersed uniformly into the non-woven fabric having irregular microcavities due to a complicated three-dimensional labyrinth structure, and is cured while maintaining the three-dimensional structure inside the non-woven fabric without clogging the cavities, thereby improving the thermal insulation properties as well as the inherent heat resistance and sound absorbing properties of the non-woven fabric, and allowing formation of the fabric into a desired shape during curing of the binder resin.

Accordingly, various aspects of the present invention are directed to providing a sound absorbing fabric with thermal insulation, the sound absorbent fabric having excellent heat resistance, sound absorbing properties, and thermal insulation properties and being formable into a desired shape during curing of a thermosetting binder resin impregnated into a non-woven fabric made of a heat-resistant fiber.

Further, various aspects of the present invention are directed to providing a method of preparing a sound absorbing fabric with thermal insulation by impregnating a non-woven fabric made of a heat-resistant fiber with an impregnating solution containing aerogel powder having a surface modified by a surfactant and a thermosetting binder resin and drying the same.

Further, various aspects of the present invention are directed to providing a method of reducing noise of a noise-generating device and providing thermal insulation thereto by means of use of the sound absorbing fabric with thermal insulation.

According to various aspects of the present invention, there is provided a sound absorbing fabric with thermal insulation, the sound absorbing fabric including: a non-woven fabric comprising a heat-resistant fiber in an amount of about 30 to about 100% by weight, e.g., about 30%, about 40%, about 50%, about 60%, about 70%, about 80%, about 90% or about 100% by weight; a silica aerogel powder having a surface modified by a surfactant; and a thermosetting binder resin, wherein the silica aerogel powder and the thermosetting binder resin are located in the same layer as the non-woven fabric, and are configured to maintain a three-dimensional structure inside the non-woven fabric.

According to various aspects of the present invention, there is provided a method of preparing a sound absorbing fabric with thermal insulation, the method including: a step (a) of preparing an impregnating solution in which silica aerogel powder surface-modified with a surfactant and a thermosetting binder resin are mixed and dispersed; a step (b) of immersing a non-woven fabric comprising: a heat-resistant fiber in an amount of about 30 to about 100% by weight, e.g., about 30%, about 40%, about 50%, about 60%, about 70%, about 80%, about 90% or about 100% by weight, in the impregnating solution; and a step (c) of drying the immersed non-woven fabric.

According to various aspects of the present invention, there is provided a method of reducing noise of a noise-generating device and providing thermal insulation thereto, the method including: checking a three-dimensional shape of the noise-generating device; preparing and forming a sound absorbing fabric as described herein to have a shape partially or entirely corresponding to the three-dimensional shape of the device; and placing the sound absorbing fabric to be adjacent to the noise-generating device.

A sound absorbing fabric of the present invention, wherein the silica aerogel powder having a surface modified by the surfactant and the thermosetting binder resin are impregnated into the non-woven fabric made of the heat-resistant fiber, has excellent heat resistance, sound absorbing properties, and thermal insulation properties, and can be formed into a three-dimensional shape by the binder resin.

In particular, the silica aerogel powder has a surface modified by the surfactant so that the silica aerogel power is superior in dispersing into the thermosetting binder resin. Therefore, it is possible to provide a sound absorbing fabric made of inorganic and organic composite materials, whereby the fabric can be expected to achieve weight reduction, improved heat resistance, and enhanced thermal insulation properties.

Further, the sound absorbing fabric of the present invention is advantageous in that a hot pressing process for integrating the non-woven fabric with a functional skin material layer is not necessary unlike a conventional sound-absorbing material having a laminated structure.

Further, since the sound absorbing fabric of the present invention has excellent thermal insulation properties, the sound absorbing fabric is prevented from being deformed or denatured even when used in a noise-generating device maintained at a high temperature of about 200° C. or above.

Further, since the sound absorbing fabric of the present invention uses the thermosetting resin as the binder resin, the sound absorbing fabric can be formed into a desired shape during the curing of the thermosetting resin. In other words, in the high-temperature forming process for preparing the sound absorbing fabric, since curing of the thermosetting resin and forming of the sound absorbing fabric are simultaneously performed, the overall process can be simplified.

Further, since the non-woven fabric including the sound absorbing fabric of the present invention is made of the heat-resistant fiber, the non-woven fabric is not deformed by reaction heat generated during thermal curing even when the thermosetting resin is used as the binder resin.

Thus, the sound absorbing fabric of the present invention can be used in fields requiring sound absorbing or sound insulating properties, including electric appliances such as air conditioners, refrigerators, washing machines, lawn mowers, etc.; transportation devices such as vehicles, ships, airplanes, etc.; construction materials such as wall materials, flooring materials, etc., and so forth. The sound absorbing fabric of the present invention can be useful for a noise-generating device maintained at a high temperature of 200° C. or above.

Particularly, when the sound absorbing fabric of the present invention is applied to a vehicle field, the sound absorbing fabric can be closely attached to a noise-generating device such as an engine and an exhaust system of a vehicle, or can be installed having a predetermined distance with the noise-generating device, or can be formed as a part of the noise-generating device.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2A and FIG. 2B are schematic views showing an example in which a sound absorbing fabric is formed as a part to be used in a noise-generating device of a vehicle, wherein FIG. 3A and FIG. 3B are schematic views showing an example in which a sound absorbing fabric is installed having a predetermined distance with the noise-generating device of a vehicle, wherein

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Various aspects of the present invention are directed to providing a sound absorbing fabric with improved thermal insulation and a method of manufacturing the same. The sound absorbing fabric of the present invention is excellent in sound absorbing properties and heat resistance, and can be formed into a desired three-dimensional shape by improving thermal insulation properties by using a silica aerogel powder and a thermosetting binder resin that are located in the same layer as a non-woven fabric made of a heat resistant fiber.

According to various aspects of the present invention, there is provided a sound absorbing fabric with thermal insulation, the sound absorbing fabric including: a non-woven fabric comprising a heat-resistant fiber in an amount of about 30 to about 100% by weight, e.g., about 30%, about 40%, about 50%, about 60%, about 70%, about 80%, about 90% or about 100% by weight; a silica aerogel powder having a surface modified by a surfactant; and a thermosetting binder resin, wherein the silica aerogel powder and the thermosetting binder resin are located in the same layer as the non-woven fabric, and maintain a three-dimensional structure inside the non-woven fabric.

According to the exemplary embodiment of a sound absorbing fabric with thermal insulation of the present invention, the sound absorbing fabric may comprise about 0.1 to about 10 parts by weight, e.g., about 0.1, about 0.5, about 1, about 1.5, about 2, about 2.5, about 3, about 3.5, about 4, about 4.5, about 5, about 5.5, about 6, about 6.5, about 7, about 7.5, about 8, about 8.5, about 9, about 9.5 or about 10 parts by weight, of a silica aerogel powder surface-modified with a surfactant and about 1 to about 60 parts by weight, e.g., about 1, about 2, about 3, about 4, about 5, about 6, about 7, about 8, about 9, about 10, about 11, about 12, about 13, about 14, about 15, about 16, about 17, about 18, about 19, about 20, about 21, about 22, about 23, about 24, about 25, about 26, about 27, about 28, about 29, about 30, about 31, about 32, about 33, about 34, about 35, about 36, about 37, about 38, about 39, about 40, about 51, about 52, about 53, about 54, about 55, about 56, about 57, about 58, about 59, or about 60 parts by weight, of a thermosetting binder resin, based on 100 parts by weight of the non-woven fabric.

According to the exemplary embodiment of the sound absorbing fabric with thermal insulation of the present invention, the heat-resistant fiber has a limiting oxygen index (LOI) of equal to or greater than 25% and a heat resistance temperature of equal to or greater than 200° C.

According to the further exemplary embodiment of the sound absorbing fabric with thermal insulation of the present invention, the heat-resistant fiber includes one or more selected from a group consisting of aramid fiber, polyphenylene sulfide (PPS) fiber, oxidized polyacrylonitrile (OXI-PAN) fiber, polyimide (PI) fiber, polybenzimidazole (PBI) fiber, polybenzoxazole (PBO) fiber, polytetrafluoroethylene (PTFE) fiber, polyketone (PK) fiber, metal fiber, carbon fiber, glass fiber, basalt fiber, silica fiber, and ceramic fiber.

According to the further exemplary embodiment of the sound absorbing fabric with thermal insulation of the present invention, the heat-resistant fiber is an aramid fiber.

According to the exemplary embodiment of the sound absorbing fabric with thermal insulation of the present invention, the non-woven fabric is a single-layer non-woven fabric having a thickness of about 3 to about 20 mm (e.g., about 3, about 4, about 5, about 6, about 7, about 8, about 9, about 10, about 11, about 12, about 13, about 14, about 15, about 16, about 17, about 18, about 19, or about 20, and made of aramid fiber having a fineness of 1 to 15 denier.

According to the further exemplary embodiment of the sound absorbing fabric with thermal insulation of the present invention, the non-woven fabric has a density of about 100 to about 2000 g/m$^2$, e.g., about 100, about 200, about 300, about 400, about 500, about 600, about 700, about 800, about 900, about 1000, about 1100, about 1200, about 1300, about 1400, about 1500, about 1600, about 1700, about 1800, about 1900, or about 2000 g/m$^2$.

According to the further exemplary embodiment of the sound absorbing fabric with thermal insulation of the present invention, the non-woven fabric has a density of about 200 to about 1200 g/m$^2$, e.g., about 200, about 300, about 400, about 500, about 600, about 700, about 800, about 900, about 1000, about 1100, about 1200 g/m$^2$.

According to the exemplary embodiment of the sound absorbing fabric with thermal insulation of the present invention, the silica aerogel powder has a surface modified by the surfactant, wherein the surfactant is polyethylene glycol $C_{10-30}$ alkyl ester. The polyethylene glycol $C_{10-30}$ alkyl ester used for the surface modification treatment of the silica aerogel powder may specifically be polyethylene glycol hexadecyl ester.

According to the exemplary embodiment of the sound absorbing fabric with thermal insulation of the present invention, the thermosetting binder resin is an epoxy resin capable of forming a three-dimensional network structure inside the non-woven fabric.

According to the further exemplary embodiment of the sound absorbing fabric with thermal insulation of the present invention, the epoxy resin includes one or more selected from a group consisting of bisphenol A diglycidyl ether, bisphenol B diglycidyl ether, bisphenol AD diglycidyl ether, bisphenol F diglycidyl ether, bisphenol S diglycidyl ether, polyoxypropylene diglycidyl ether, bisphenol A diglycidyl ether polymer, phosphagen diglycidyl ether, bisphenol A novolac epoxy, phenol novolac epoxy resin, and o-cresol novolac epoxy resin.

According to the exemplary embodiment of the present invention, the sound absorbing fabric with thermal insulation may be formed into a three-dimensional shape of a desired subject.

According to the exemplary embodiment of the present invention, the sound absorbing fabric with thermal insulation may consist of a single layer or multiple layers.

According to the exemplary embodiment of the present invention, the sound absorbing fabric with thermal insulation may be used for a vehicle.

Figure 1A:
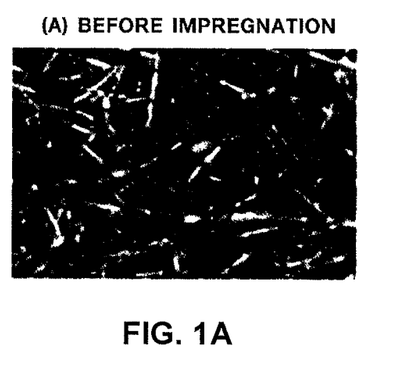
FIG. 1A and FIG. 1B are images showing an internal structure of a non-woven fabric before and after impregnation with an impregnating solution.
Figure 1B:
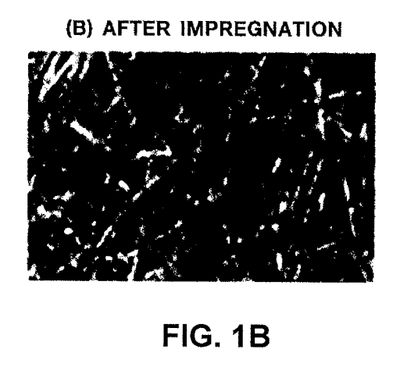

FIG. 1A and FIG. 1B are electron microscope photographs showing the internal structure of the non-woven fabric before and after impregnation with an impregnating solution in which the silica aerogel powder having a surface modified by the surfactant and the thermosetting binder resin are mixed and dispersed.

FIG. 1A is an electron micrograph showing the internal structure of the non-woven sound absorbing fabric before impregnation with the impregnating solution, and it can be seen that the heat-resistant fibers are crossed with each other to form irregular cavities. FIG. 1B is an electron micrograph showing the internal structure of the non-woven fabric after impregnation with the impregnating solution, and it can be seen that the silica aerogel powder and the binder resin are finely and uniformly distributed and adhere to the heat resistant fiber yarns.

Referring to FIG. 1A and FIG. 1B, the sound absorbing fabric according to an exemplary embodiment of the present invention has a three-dimensional network structure formed by the heat-resistant fibers consisting of the non-woven fabric and thereby to form the sufficient number of micro cavities. Further, the inorganic silica aerogel powder and the organic binder resin are uniformly dispersed without clogging the cavities. Thus, the sound absorbing fabric of the present invention can obtain improved thermal insulation properties as well as improved sound absorbing properties.

In general, non-woven fabrics have a structure in which the fibers are disorderly arranged in a three-dimensional manner. Thus, the pore structure inside the non-woven fabric forms a very complex labyrinth system whereby pores are three-dimensionally connected by a rule or irregular fiber array, rather than a bundle of independent capillary tubes. That is, the non-woven fabric of the present invention has a structure in which heat-resistant fiber yarns loosely cross each other, thereby irregularly forming micro cavities.

When the non-woven fabric is impregnated with the impregnating solution, the silica aerogel powder and the binder resin are finely and uniformly distributed and adhere to the surfaces of the heat-resistant fiber yarns, and thus, the non-woven fabric forms micro cavities having a finer size than that of a non-woven fabric before impregnation. The formation of micro cavities in the internal structure of the non-woven fabric means that noise resonance is increased, which means that sound absorbing properties are improved. If the silica aerogel powder and the binder resin form a three-dimensional network structure themselves, the number of micro cavities may be further increased inside the non-woven fabric, whereby the sound absorbing properties can be further improved.

Therefore, the sound absorbing fabric of the present invention is a non-woven fabric in which the silica aerogel powder and the binder resin are uniformly impregnated into the non-woven fabric to maintain the original three-dimensional structure of the non-woven fabric. Furthermore, the number of micro cavities can be increased by hardening of the silica aerogel powder and the binder resin. Thus, when noise propagates, increasingly more noise resonances are generated in the non-woven fabric, thereby increasing an effect of noise cancellation, and efficiency of noise cancellation is maximized, thereby achieving significantly improved sound absorbing performance.

The sound absorbing fabric of the present invention having such an internal structure will be described in more detail with reference to the respective constituent components.

In an exemplary embodiment of the present invention, a heat-resistant fiber is used as a main fiber including the non-woven fabric.

The heat-resistant fiber can be made of any durable material that can withstand high-temperature and ultra-high-temperature conditions. Specifically, a heat-resistant fiber having a limiting oxygen index (LOI) of equal to greater than 25% and a heat resistance temperature of equal to greater than 150° C. is used. A heat-resistant fiber having a limiting oxygen index (LOI) of about 25 to about 80% (e.g., about 25%, about 30%, about 35%, about 40%, about 45%, about 50%, about 55%, about 60%, about 65%, about 70%, about 75%, or about 80%) and a heat resistance temperature of 150 to 3000° C. (e.g., 150° C., 200° C., 300° C., 400° C., 500° C., 600° C., 700° C., 800° C., 900° C., 1000° C., 1100° C., 1200° C., 1300° C., 1400° C., 1500° C., 1600° C., 1700° C., 1800° C., 1900° C., 2000° C., 2100° C., 2200° C., 2300° C., 2400° C., 2500° C., 2600° C., 2700° C., 2800° C., 2900° C., or about 3000° C.) is used. A A heat resistant fiber having a limiting oxygen index (LOI) of about 25 to about 70% (e.g., about 25%, about 30%, about 35%, about 40%, about 45%, about 50%, about 55%, about 60%, about 65%, or about 70%) and a heat resistance temperature of 200 to 1000° C. (e.g., about 200° C., 300° C., 400° C., 500° C., 600° C., 700° C., 800° C., 900° C., or about 1000° C.) is used. A heat-resistant fiber having a fineness of 1 to 15 denier (e.g., about 1, 2, 3, 4, 5, 6, 7, 8, 9, 10, 11, 12, 13, 14, or 15 denier), preferably 1 to 6 denier (about 1, 2, 3, 4, 5, or 6 denier), and a yarn length of about 20 to about 100 mm (e.g., about 20 mm, about 21, about 22, about 23, about 24, about 25, about 26, about 27, about 28, about 29, about 30, about 31, about 32, about 33, about 34, about 35, about 36, about 37, about 38, about 39, about 40, about 51, about 52, about 53, about 54, about 55, about 56, about 57, about 58, about 59, about 60, about 61, about 62, about 63, about 64, about 65, about 66, about 67, about 68, about 69, about 70, about 71, about 72, about 73, about 74, about 75, about 76, about 77, about 78, about 79, about 80, about 81, about 82, about 83, about 84, about 85, about 86, about 87, about 88, about 89, about 90, about 91, about 92, about 93, about 94, about 95, about 96, about 97, about 98, about 99, or about 100 mm), preferably 40 to 80 mm (e.g., about 40, about 51, about 52, about 53, about 54, about 55, about 56, about 57, about 58, about 59, about 60, about 61, about 62, about 63, about 64, about 65, about 66, about 67, about 68, about 69, about 70, about 71, about 72, about 73, about 74, about 75, about 76, about 77, about 78, about 79, or about 80 mm) is used.

As the heat resistant fiber, commonly called "super fiber" in the conventional art may be used. Specifically, the super fiber may include one or more selected from a group consisting of aramid fiber, polyphenylene sulfide (PPS) fiber, oxidized polyacrylonitrile (OXI-PAN) fiber, polyimide (PI) fiber, polybenzimidazole (PBI), polybenzoxazole (PBO) fiber, polytetrafluoroethylene (PTFE) fiber, polyketone (PK) fiber, metal fiber, carbon fiber, glass fiber, basalt fiber, silica fiber, and ceramic fiber.

In an exemplary embodiment of the present invention, aramid fiber may be used as the heat-resistant fiber. Specifically, a meta-aramid, a para-aramid, or a mixture thereof may be used as the heat-resistant fiber. In an exemplary embodiment of the present invention, an aramid fiber used as a yarn of the non-woven fabric has a fineness of 1 to 15 denier, preferably 1 to 6 denier. A yarn length is from 20 to 100 mm, preferably from 40 to 80 mm. If the yarn length is too short, the binding force of the non-woven fabric may be weakened due to difficulty in bridging of the yarn during needle punching. If the yarn length is too long, the binding force of the non-woven fabric is excellent, but there may be a problem in that the yarn feeding is not efficient during carding. The aramid fiber is used for products such as filament, staple, and yarn, and is used in fields using strength reinforcing materials (transformer, motor, etc.), insulating materials (insulating paper, insulating tape, etc.), heat-resistant fibers (fire fighting clothing, fire protection gloves, etc.), high-temperature filters, and the like.

The non-woven fabric including the sound absorbing fabric of the present invention is characterized in that the heat-resistant fiber is used as a yarn. However, for cost reduction, weight reduction, functionalization, etc. of the non-woven fabric, non-woven fabrics made by incorporating other fibers in addition to the above heat-resistant fiber may also be included in the scope of the present invention. That is, the non-woven fabric of the present invention is prepared by using the heat-resistant fiber as the yarn, but is not limited thereto. If the amount of the heat-resistant fiber included in the non-woven fabric of the present invention is limited, the non-woven fabric may include a heat-resistant fiber in an amount of 30 to 100% (e.g., about 30%, about 40%, about 50%, about 60%, about 70%, about 80%, about 90% or about 100%), or 60 to 100% (e.g., about 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, about 99%, or about 100%) by weight, based on the total weight of the non-woven fabric.

In addition, the sound absorbing fabric of the present invention includes the silica aerogel powder and the binder resin located on the same layer as the non-woven fabric and maintaining a three-dimensional structure inside the non-woven fabric. In other words, the silica aerogel powder and the thermosetting binder resin are finely and uniformly distributed and adhere to the surfaces of the heat-resistant fiber yarns, thereby keeping the micro cavities of the non-woven fabric unclogged.

As a material to be impregnated in the sound absorbing fabric of the present invention, silica aerogel has a high porosity of up to about 99%, and is a porous material having a network structure in which pores are minutely connected to each other, with properties such as heat insulation, ultra-lightness, sound absorption, and a low dielectric constant.

The silica aerogel is generally prepared by a sol-gel process. The sol-gel process may be carried out on the basis of sol-gel techniques well known to those skilled in the art, for example, a wet gel is prepared by sol-gel condensation reaction of a silica precursor solution and the wet gel is dried, thereby preparing a silica aerogel. The wet gel is obtained by hydrolysis and condensation reactions by the reaction of silica precursors with water during the sol-gel process, and aging. For example, by adding a catalyst to the silica precursors and water in an alcohol solvent, the hydrolysis proceeds, and the condensation reaction of the hydrolyzate proceeds to form a "sol" compound. At this time, the condensation reaction may be carried out in the presence of a base or an acid catalyst, but in the case of using a metal alkoxide, it is more preferable to use the base catalyst. The solution in the sol state is gelled and aged for a sufficient time to produce a wet gel. However, since the silica aerogel powder has poor miscibility and bonding force with respect to the non-woven fabric and the binder resin, the silica aerogel powder may be scattered from the sound absorbing fabric after being impregnated into the sound absorbing fabric and dried.

In an exemplary embodiment of the present invention, silica aerogel powder has a surface modified by a surfactant to have hydrophilicity, which results in improvement of miscibility and bonding strength with respect to the non-woven fabric and the binder resin. Thus, the silica aerogel powder is not scattered but firmly attached after being impregnated into the non-woven fabric and dried. The surfactant used for the surface modification treatment of the silica aerogel powder is polyethylene glycol $C_{10\text{-}30}$ alkyl ester, specifically, polyethylene glycol hexadecyl ester.

A surface modification method of silica aerogel powder is carried out by adding silica aerogel powder to a diluted solution of a surfactant, which is used as a surface modifier, and an alcohol solvent, and mixing and stirring. Specifically, about 1 to about 4 parts by weight of a silica aerogel powder may be added to 100 parts by weight of a solution prepared by mixing about 5 to about 20 wt % a surfactant and about 80 to about 95 wt % alcohol, followed by stirring and then drying at 50° C. for 24 hours. The present invention does not particularly limit the surface modification method of the silica aerogel powder. However, in consideration of miscibility with the non-woven fabric and the binder resin, 5 to 10 parts by weight of a surfactant of polyethylene glycol $C_{10\text{-}30}$ alkyl ester may be contained based on 1 part by weight of a silica aerogel powder.

As a material impregnated into the sound absorbing fabric of the present invention, the binder resin may be any binder resin capable of maintaining a three-dimensional structure inside the non-woven fabric. The "maintaining the three-dimensional structure inside non-woven fabric" means that the binder resin is impregnated into the non-woven fabric and then is uniformly distributed and adheres to the surfaces of fiber yarns of the non-woven fabric, thereby maintaining a structure of or facilitating formation of the micro cavities to maintain the original three-dimensional internal structure of the non-woven fabric.

In general, a "binder" refers to a material used for adhering or bonding between two materials, but the "binder resin" in an exemplary embodiment of the present invention refers to a resin impregnated into the non-woven fabric made of the heat-resistant fiber.

Various materials may be applied to the binder resin being impregnated into the non-woven fabric. First, a thermoplastic resin or a thermosetting resin may be considered as the binder resin.

Among them, it is more preferable to use a thermosetting binder resin. When the thermosetting binder resin is impregnated into the non-woven fabric made of thermoplastic heat-resistant fiber, the micro cavities of the non-woven fabric are present in an open state because a boundary layer is formed by line contact of these heterogeneous materials. That is, when the thermosetting resin is used as a binder resin impregnated into the non-woven fabric made of the heat-resistant fiber, it is possible to maintain the three-dimensional structure inside the non-woven fabric. Thus, in an exemplary embodiment of the present invention, the thermosetting resin may be employed as the binder resin.

Further, the thermosetting resin has properties of being curable by light, heat, or a curing agent, and of not deforming its shape even under high temperature conditions. Thus, according to an exemplary embodiment of the present invention, the heat-resistant fiber and the thermosetting binder resin are employed under specific conditions so that a shape of the sound absorbing fabric can be maintained at high temperature conditions after forming. Thus, when the thermosetting resin is used as the binder resin impregnated into the non-woven fabric, forming into a desired shape can be achieved during curing of the resin, and the shape can be maintained even under high temperature conditions.

As described above, when the thermosetting resin is used as the binder resin impregnated into the non-woven fabric made of the heat resistant fiber, it is expected that the effect of forming into the desired shape during the curing of the binder resin can be obtained in addition to the effect of maintaining the three-dimensional structure inside the non-woven fabric.

An epoxy resin can be used as the binder resin. The epoxy resin is a kind of the thermosetting resin and has properties of being cured into a polymer material having a three-dimensional network structure at the time of curing. Accordingly, when the epoxy resin is impregnated into the internal structure of the non-woven fabric and is cured, it forms other micro cavities due to its own network structure, whereby more micro cavities can be formed inside the non-woven fabric. Thus, sound absorbing properties can be further improved.

Further, if the curing reaction proceeds in the presence of the curing agent, a more advanced three-dimensional network structure can be formed so that a sound absorption effect can be further improved. That is, functional groups such as an epoxy group or a hydroxy group in the epoxy resin and an amine group or a carboxylic acid group in the curing agent react with each other to form crosslinks through covalent bonds, thereby forming a three-dimensional network polymer. At this time, the curing agent acts not only as a catalyst for accelerating the curing reaction, but also is directly involved in the curing reaction and is linked in the molecule of the epoxy resin. Thus, it is possible to control size and physical properties of the micro cavities according to the type of the curing agent.

The epoxy resin may include one or more selected from a group consisting of bisphenol A diglycidyl ether, bisphenol B diglycidyl ether, bisphenol AD diglycidyl ether, bisphenol F diglycidyl ether, bisphenol S diglycidyl ether, polyoxypropylene diglycidyl ether, bisphenol A diglycidyl ether polymer, phosphazine diglycidyl ether, bisphenol A novolac epoxy, phenol novolac epoxy resin, o-cresol novolac epoxy resin, etc. It is more preferable to use an epoxy resin having an epoxy equivalent weight of 70 to 400. When the epoxy equivalent weight is too small, intermolecular binding may be too weak to form a three-dimensional network structure or the physical properties of the sound absorbing fabric are deteriorated due to weak adhesion to the heat-resistant fiber. On the other hand, when the epoxy equivalent weight is too high, an excessively dense network structure may be formed and thus sound absorbing properties may be deteriorated.

Further, in an exemplary embodiment of the present invention, when the thermosetting resin is used as the binder resin, a curing agent may be included in an impregnating solution. As the curing agent, it is preferable to use a compound having a functional group which is easy to react with a functional group of the binder resin such as an epoxy group or a hydroxy group. Such a curing agent may include an aliphatic amine, an aromatic amine, an acid anhydride, urea, an amide, imidazole, and the like. Specifically, the curing agent may comprise one or more selected from the group consisting of diethyltoluene diamine (DETDA), diaminodiphenylsulfone (DDS), boron trifluoride monoethylamine ($BF_3$.MEA), diaminocyclohexane (DACH), methyltetrahydrophthalic anhydride (MTHPA), methyl-5-norbornene-2,3-dicarboxylic anhydride (NMA), dicyandiamide (Dicy), and 2-ethyl-4-methyl-imidazole. An aliphatic amine- or amide-based curing agent may be used because they have relatively high crosslinking ability, and excellent chemical resistance and weather resistance. Particularly, dicyandiamide (Dicy) may be used in consideration of crosslinking ability, flame retardancy, heat resistance, storage stability, processability, etc. Because dicyandiamide (Dicy) has a melting point above 200° C., it provides excellent storage stability after being mixed with the epoxy resin, and thus can secure sufficient processing time for curing and forming.

Further, in an exemplary embodiment of the present invention, a catalyst for promoting the curing of the thermosetting resin used as the binder resin may also be used. The catalyst may comprise one or more selected from a group consisting of urea, dimethylurea, a tetraphenylborate salt of quaternary DBU, quaternary phosphonium bromide, etc. The catalyst may be included in a solution containing the binder resin.

Further, in an exemplary embodiment of the present invention, various additives such as a flame retardant, a heat resistance improver, a water repellent, etc. may be used for imparting functionality to the sound absorbing fabric. Since the additive is included in the impregnating solution, no additional skin material to impart functionality to the sound absorbing fabric is required.

The flame retardant may include melamine, phosphate, metal hydroxide, etc. Specifically, the flame retardant may include one or more selected from a group consisting of melamine, melamine cyanurate, melamine polyphosphate, phosphazene, ammonium polyphosphate, etc. More specifically, the flame melamine retardant may be melamine, which can be expected to simultaneously enhance flame retardancy and heat resistance.

The heat resistance improver may include alumina, silica, talc, clay, glass powder, glass fiber, metal powder, etc.

The water repellent may include one or more selected from a group consisting of fluorine-based water repellent, etc.

In addition, additives commonly used in the art may be selected depending on desired purposes.

According to various aspects of the present invention, there is provided a method of preparing a sound absorbing fabric, the method including: step (a) of preparing an impregnating solution in which silica aerogel powder surface-modified with a surfactant and a thermosetting binder resin are mixed and dispersed; step (b) of immersing a non-woven fabric comprising about 30 wt % to about 100 wt % (e.g., about 30 wt %, about 40 wt %, about 50 wt %, about 60 wt %, about 70 wt %, about 80 wt %, about 90 wt % or about 100 wt %), or 60 to 100 wt % (e.g., about 60 wt %, about 61 wt %, about 62 wt %, about 63 wt %, about 64 wt %, about 65 wt %, about 66 wt %, about 67 wt %, about 68 wt %, about 69 wt %, about 70 wt %, about 71 wt %, about 72 wt %, about 73 wt %, about 74 wt %, about 75 wt %, about 76 wt %, about 77 wt %, about 78 wt %, about 79 wt %, about 80 wt %, about 81 wt %, about 82 wt %, about 83 wt %, about 84 wt %, about 85 wt %, about 86 wt %, about 87 wt %, about 88 wt %, about 89 wt %, about 90 wt %, about 91 wt %, about 92 wt %, about 93 wt %, about 94 wt %, about 95 wt %, about 96 wt %, about 97 wt %, about 98 wt %, about 99 wt %, or about 100 wt %) a heat-resistant fiber in the impregnating solution; and step (c) of drying the immersed non-woven fabric.

The method of preparing the sound absorbing fabric according to an exemplary embodiment of the present invention will be described in more detail as follows.

Step a) is a step of preparing the impregnating solution in which the non-woven fabric is immersed.

The impregnating solution in which the non-woven fabric is immersed consists of a curing agent, a catalyst, conventional additives, and a solvent in addition to the silica aerogel powder and the binder resin.

The silica aerogel powder, the binder resin, the curing agent, the catalyst, and the conventional additives included in the impregnating solution are as defined in the above. Further, as the solvent used in the preparing of the impregnating solution, one or more selected from a group consisting of a ketone type, a carbonate type, an acetate type, a cellosolve type, and an alcohol type may be used. Specifically, the solvent may comprise one or more selected from the group consisting of acetone, methyl ethyl ketone (MEK), methyl isobutyl ketone (MIBK), dimethyl carbonate (DMC), ethyl acetate, butyl acetate, methyl cellosolve, ethyl cellosolve, butyl cellosolve, methanol, ethanol, isopropyl alcohol, etc.

Specifically, the impregnating solution used in an exemplary embodiment of the present invention may include a silica aerogel powder having surface-modified by with a surfactant in an amount of about 0.1 to about 10% by weight, about 1 to about 60 wt % a thermosetting binder resin in an amount of about 1 to about 60% by weight, about 0.1 to about 10 wt % a curing agent in an amount of about 0.1 to about 10% by weight, about 0.01 to about 5 wt % a catalyst in an amount of about 0.01 to about 5% by weight, about 1 to about 40 wt % an additive in an amount of about 1 to about 40% by weight, and about 30 to about 95 wt % a solvent in an amount of about 30 to about 95% by weight. In addition to the impregnating solution used in an exemplary embodiment of the present invention, other additives such as a curing agent and a catalyst may be used. In this case, the impregnating solution may include a silica aerogel powder having surface-modified with a surfactant in an amount of about 0.1 to about 5% by weight, about 1 to about 30 wt % a thermosetting binder resin in an amount of about 1 to about 30% by weight, about 0.1 to about 10 wt % a curing agent in an amount of about 0.1 to about 10% by weight, about 0.01 to about 5 wt % a catalyst in an amount of about 0.01 to about 5% by weight, about 1 to about 30 wt % a flame retardant in an amount of about 1 to about 30% by weight, and about 40 to about 95 wt % a solvent in an amount of about 40 to about 95% by weight. The degree of impregnation into the non-woven fabric may be controlled by controlling the concentration of the impregnating solution of the present invention. Specifically, the impregnating solution may be prepared to have about 1 to about 60 wt % a solid content, preferably about 20 to about 50 wt %. When the concentration of the impregnating solution is too low, the amount of the binder resin impregnated into the non-woven fabric is low and thus the desired effect of the present invention cannot be obtained. When the concentration of the impregnating solution is too high, the non-woven fabric may harden and may insufficiently function as a sound absorbing fabric.

Further, when the amount of the curing agent included in the impregnation solution is too small, forming into a desired shape may be difficult because complete curing of the binder resin cannot be expected, and the effect of improving the mechanical strength of the sound absorbing fabric may be insufficient. On the contrary, when the amount of the curing agent is too large, the sound absorbing fabric may harden and storage stability may be reduced. Further, when the amount of the catalyst is too small, the degree of promoting reaction is insignificant, whereas when the amount of the catalyst is too large, storage stability may be reduced. Further, as the additives, one or more selected from a group consisting of flame retardant, a heat resistance improver, a water repellent, and the like which are commonly used in the art may be used. The amount of these additives may be appropriately adjusted depending on the purpose of use. If the addition amount is too small, the desired effect may not be obtained, whereas if the addition amount is too high, economical efficiency may be lowered and undesirable side effects may be caused.

Step b) is a step of immersing the non-woven fabric made of the heat-resistant fiber in the impregnating solution.

In an exemplary embodiment of the present invention, the non-woven fabric is immersed in the impregnation solution so that sound absorbing and thermal insulation properties can be improved, and the sound absorbing fabric can be formed into a desired shape. Specifically, the non-woven fabric is completely immersed in the impregnating solution, and the impregnating solution is uniformly impregnated into the non-woven fabric by applying a predetermined pressure.

Step (c) is a step of drying the immersed non-woven fabric.

In an exemplary embodiment of the present invention, the drying is carried out by taking out the impregnated non-woven fabric from the impregnating solution and removing the solvent. At this time, the drying may be carried out at appropriate temperatures and under appropriate pressure. Specifically, the drying may be carried out at a temperature of about 70 to about 200° C., more preferably about 100 to about 150° C. The drying of the present invention is a process whereby the amount of the binder resin in the non-woven fabric is controlled. Accordingly, the physical properties of the sound absorbing fabric can be controlled. The amount of binder resin in the non-woven fabric after drying is an important factor determining the size, shape, and distribution of micro cavities in the sound absorbing fabric, which can control the sound absorbing and mechanical properties of the sound absorbing fabric.

In an exemplary embodiment of the present invention, the sound absorbing fabric prepared by the drying may include about 0.1 to about 10 parts by weight of a silica aerogel powder surface-modified with a surfactant, more preferably about 0.5 to about 5 parts by weight, based on 100 parts by weight of a nonwoven fabric. Further, the sound absorbing fabric may include about 1 to about 60 parts by weight of a thermosetting binder resin, more preferably about 1 to about 30 parts by weight, based on 100 parts by weight of the non-woven fabric.

Meanwhile, the method of preparing the sound absorbing fabric of the present invention further includes a step (d) of preparing a sound absorbing fabric by forming the dried non-woven fabric at high temperature after step (c).

Specifically, when step (d) is further included, the method of preparing the sound absorbing fabric includes: step (a) of preparing an impregnating solution in which a silica aerogel powder surface-modified with a surfactant and a thermosetting binder resin are mixed and dispersed; step (b) of immersing a non-woven fabric comprising 30 to 100 wt % a heat-resistant fiber in the impregnating solution; step (c) of drying the immersed non-woven fabric; and step (d) of forming the dried non-woven fabric at high temperature, thereby producing a sound absorbing fabric.

Step (d) is a step of forming the dried non-woven fabric at high temperature to produce a sound absorbing fabric. The forming at high temperature is a process in which the curing reaction of the thermosetting binder resin is also considered, and is carried out at a temperature of about 150 to about 300° C., preferably about 170 to about 230° C.

Meanwhile, the method of preparing the sound absorbing fabric of the present invention further includes a step a-1) of preparing a non-woven fabric by needle punching of a heat-resistant fiber prior to step a). For example, the step a-1) is a step of preparing an aramid non-woven fabric having a thickness of about 3 to about 20 mm by needle punching of a heat-resistant aramid fiber having a fineness of about 1 to about 15 denier.

When Step a-1) is included, the method of preparing the sound absorbing fabric according to an exemplary embodiment of the present invention may include: step a-1) of forming an aramid non-woven fabric having a thickness of about 3 to about 20 mm by needle punching of a heat-resistant aramid fiber having a fineness of about 1 to about 15 denier; step (a) of preparing an impregnating solution in which silica aerogel powder surface-modified with a surfactant and a thermosetting binder resin are mixed and dispersed; step (b) of immersing a non-woven fabric comprising about 30 to about 100 wt % a heat-resistant fiber in the impregnating solution; and step (c) of drying the immersed non-woven fabric.

Step a-1) of preparing the non-woven fabric includes needle punching of the heat-resistant fiber. It is predicted that the sound absorbing properties may vary depending on the thickness and density of the non-woven fabric, and the sound absorbing properties will be increased with an increase in the thickness and density of the non-woven fabric.

In an exemplary embodiment of the present invention, the non-woven fabric may have a thickness of about 3 to about 20 mm in consideration of an industrial field to which the sound absorbing fabric is applied. The reason for this is that when the thickness of the non-woven fabric is less than 3 mm, it is difficult to satisfy the durability and formability of the sound absorbing fabric. In contrast, when the thickness exceeds about 20 mm, productivity is lowered during production and processing of the fabric and production cost is increased. In addition, the non-woven fabric may have a density of about 100 to about 2000 g/m$^2$, preferably about 200 to about 1200 g/m$^2$, more preferably about 300 to about 800 g/m$^2$ in consideration of performance and cost.

The aramid non-woven fabric consists of about 2 to about 12 (e.g., about 2, 3, 4, 5, 6, 7, 8, 9, 10, or about 12) layers of about 30 to about 100 g/m$^2$ (e.g., about 30 g/m$^2$, 40, 50, 60, 70, 80, 90 or about 100 g/m$^2$) web formed by carding, followed by continuously performing first up-down preeneedling, second down-up needling, third up-down needling, thereby forming physical bridges for adjusting thickness, securing binding strength, and realizing other desired physical properties. At this time, a needle used to perform the needling is a barb-type needle having a working blade of about 0.5 to about 3 mm (e.g., about 0.5 mm, 1, 1.5, 2, 2.5, or about 3 mm) and a needle length (distance from crank outside to point) of about 70 to about 120 mm (e.g., about 70 mm, 80, 90, 100, 110, or about 120 mm). Here, the needle stroke may be about 30 to about 350 times/m$^2$ (e.g., about 30 times/m$^2$, 40, 50, 60, 70, 80, 90, 100, 110, 120, 130, 140, 150, 160, 170, 180, 190, 200, 210, 220, 223, 240, 250, 260, 27, 280, 290, 300, 310, 320, 330, 340, or about 350 times/m$^2$).

More specifically, a fineness of yarn of the non-woven fabric may be about 1.5 to about 8.0 denier (e.g., about 1.5 denier, 2, 2.5, 3, 3.5, 4, 4.5, 5, 5.5, 6, 6.5, 7, 7.5, or 8 denier), a thickness of a pile layer may be about 6 to about 13 mm (e.g., about 6 mm, 7, 8, 9, 10, 11, 12, or about 13 mm), the needle stroke may be about 120 to about 250 times/m$^2$ (e.g., about 120 times/m$^2$, 130, 140, 150, 160, 170, 180, 190, 200, 210, 220, 230, 240, or about 250 times/m$^2$), and a density of the non-woven fabric may be about 300 to about 800 g/m$^2$ (e.g., about 300, 350, 400, 450, 500, 550, 600, 650, 700, 750, or 850 g/m$^2$).

The internal structure of the sound absorbing fabric prepared by the above-described method may be confirmed using an electron microscope. When observed with the electron microscope, the sound absorbing fabric of the present invention has 1 to 100 μm sized micro cavities distributed inside thereof, and these micro cavities were regularly or irregularly distributed at intervals of about 0.1 to about 500 μm (e.g., about 0.1 μm, 0.2, 0.3, 0.4, 0.5, 0.6, 0.7, 0.8, 0.9, 1, 2, 3, 4, 5, 6, 7, 8, 9, 10, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, or about 500 μm).

According to various aspects of the present invention, the present invention is directed to providing a method of reducing noise of a nose-generating device and providing thermal insulation thereto, the method including: checking a three-dimensional shape of a noise-generating device; preparing and forming a sound absorbing fabric such that a shape of the sound absorbing fabric corresponds to the three-dimensional shape of the device partially or entirely; and placing the sound absorbing fabric to be adjacent to the noise-generating device.

The term "device" refers to a noise-generating device that includes a motor, an engine, an exhaust system, and the like, but is not limited thereto. The shape of the sound absorbing fabric may be prepared to correspond to the three-dimensional shape of the device partially or entirely. Since the sound absorbing fabric of the present invention has the advantage of being formable during curing of the binder resin, the sound absorbing fabric may be formed to correspond to the three-dimensional shape of the device partially or entirely.

The term "adjacent" in the above means closely attaching the sound absorbing fabric to the noise-generating device, installing having a predetermined distance with the noise-generating device, or forming it as a part applied to the noise-generating device. Further, the term "adjacent" in an exemplary embodiment of the present invention also includes additionally mounting the sound absorbing fabric to a member coupled to the noise-generating device (e.g., another sound absorbing fabric).

FIG. 2A to FIG. 3B are views schematically showing representative examples in which the sound absorbing fabric of the present invention is used for a noise-generating device of a vehicle.

Figure 2A:
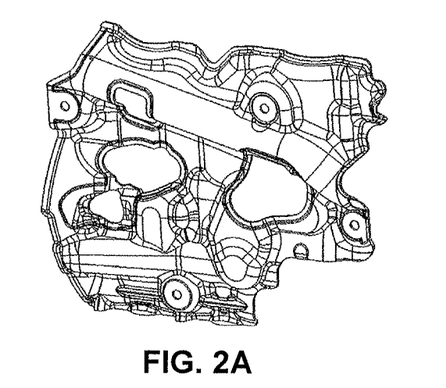
FIG. 2A is an image of a sound absorbing fabric formed to be used in a vehicle engine.
Figure 2B:
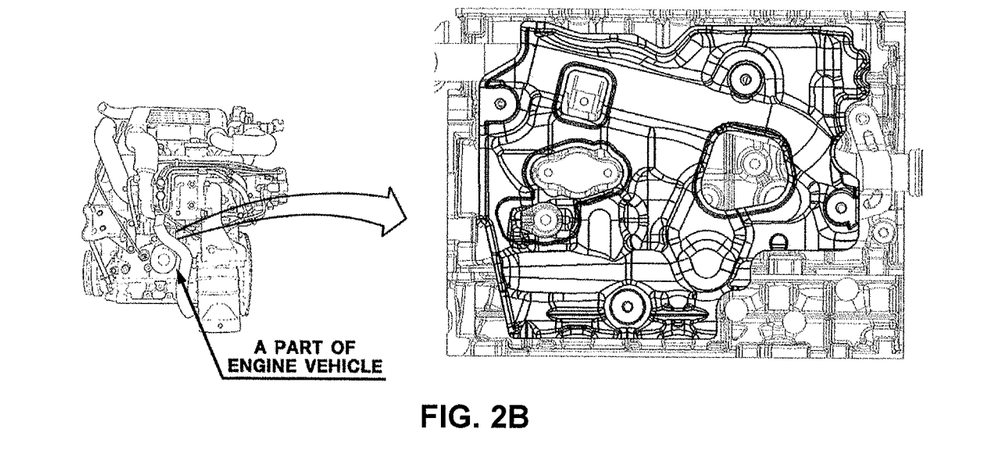
FIG. 2B is an image showing an example in which the sound absorbing fabric is installed at a part of the vehicle engine.

FIG. 2A and FIG. 2B are schematic views showing an example in which a sound absorbing fabric is formed as a part and used for the noise-generating device of the vehicle, wherein FIG. 2A is an image of the sound absorbing fabric formed to be used for a vehicle engine, and FIG. 2B is an image showing an example in which the sound absorbing fabric is installed at a part of the vehicle engine.

Figure 3A:
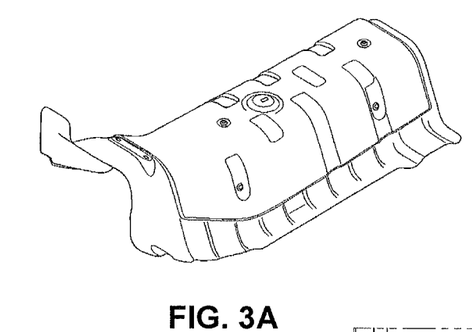
FIG. 3A is an image of a sound absorbing fabric formed to be used in a lower part of the vehicle.
Figure 3B:
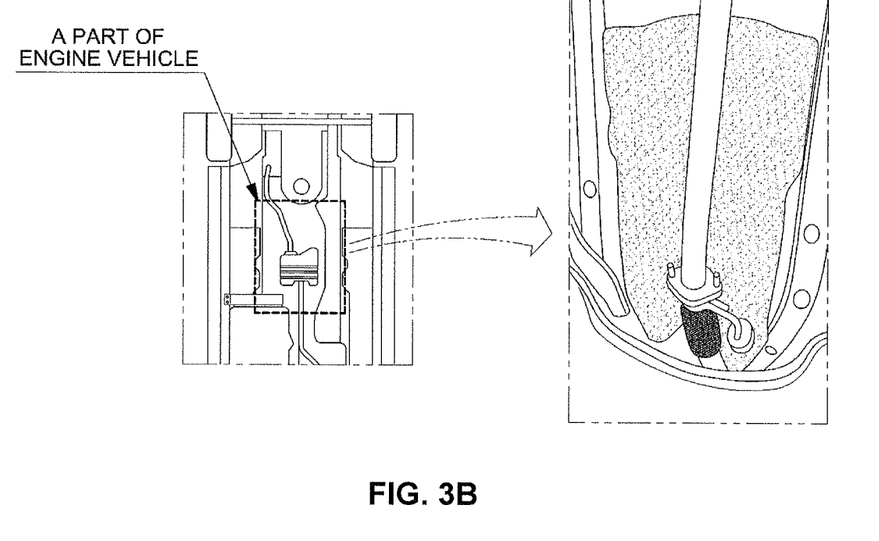
FIG. 3B is an image showing an example in which the sound absorbing fabric is installed at the lower part of the vehicle engine.

FIG. 3A and FIG. 3B are schematic views showing an example in which the sound absorbing fabric is used for the noise-generating device of the vehicle, wherein FIG. 3A is an image of sound absorbing fabric formed to be used in a lower part of the vehicle, and FIG. 3B is an image showing an example in which the sound absorbing fabric is installed at the lower part of the vehicle engine.

As described above, the sound absorbing fabric of the present invention, wherein the binder resin is impregnated into the non-woven fabric so as to maintain the three-dimensional structure inside the nonwoven fabric, is excellent in heat resistance, sound absorbing properties, and thermal insulation properties. Thus, it is possible to exhibit desired sound absorbing or thermal insulation performance without causing deformation of the shaped body when directly applied to a noise-generating device maintained at a high temperature of about 200° C. or above, as well as at room temperature.

Hereinafter, the present invention will be described in more detail based on the following examples, but the present invention is not limited by the following examples.

EXAMPLES

Preparation of Sound Absorbing Fabric

Example 1. Preparation of Sound Absorbing Fabric Using Silica Aerogel Powder and Epoxy Resin-Impregnated Aramid Non-Woven Fabric An m-aramid short fiber having a limiting oxygen index (LOI) of 40%, a heat resistance temperature of 300° C., a fineness of 2 denier, and a length of 51 mm was air blown and formed into a web of 30 g/m$^2$ through carding. The web was stacked by overlapping 10-fold on a conveyor belt operated at 5 m/min using a horizontal wrapper. The stacked web was continuously subjected to up-down needling, down-up needling, and up-down needling with a needle stroke of 150 times/m² to prepare an aramid non-woven fabric having a density of 300 g/m² and a thickness of 6 mm.

The prepared non-woven fabric was immersed in an impregnating solution with 1 dip 1 nip (pick-up 300%). At this time, the impregnating solution was prepared by mixing 8 wt % bisphenol A diglycidyl ether, 2 wt % bisphenol A diglycidyl ether polymer, 0.2 wt % dicyandiamide, 0.02 wt % dimethylurea, 9 wt % melamine cyanurate, 16 wt % isopropyl alcohol, and 60.78 wt % dimethyl carbonate, and adding 2 wt % a surface-modified silica aerogel powder thereto. The surface-modified silica aerogel powder was prepared by adding 2 parts by weight of a silica aerogel powder to 100 parts by weight of a surfactant solution composed of 10 wt % surfactant of polyethylene glycol hexadecyl ester and 90 wt % isopropyl alcohol, and stirring, followed by hot air drying at 50° C. for 24 hours.

The non-woven fabric was taken out from the impregnating solution and dried at 150° C. The dried non-woven fabric contained 1 part by weight of a surface-modified silica aerogel powder and 20 parts by weight of a binder resin, based on 100 parts by weight of the dried non-woven fabric. Then, the dried non-woven fabric was shaped into a desired shape by curing at 200° C. for 2 minutes.

Example 2. Preparation of Sound Absorbing Fabric Using Silica Aerogel Powder and Epoxy Resin-Impregnated Glass Fiber Mat E-glass fiber needle mat (EGNM) having a density of 300 g/m² and a thickness of 6 mm was impregnated with the impregnating solution in Example 1, dried and formed.

Comparative Example 1. Preparation of Sound Absorbing Fabric Using Silica Aerogel Powder and Epoxy Resin-Impregnated Aramid Non-Woven Fabric A sound absorbing fabric was prepared in the same manner as in Example 1 except that the impregnating solution with which the aramid non-woven fabric is impregnated contained silica aerogel powder that had not been surface-modified. The impregnating solution used herein contained 8 wt % bisphenol A diglycidyl ether, 2 wt % bisphenol A diglycidyl ether polymer, 0.2 wt % dicyandiamide, 0.02 wt % dimethylurea, 10 wt % melamine cyanurate, 77.78 wt % dimethyl carbonate, and 2 wt % silica aerogel powder.

Comparative Example 2. Preparation of Sound Absorbing Fabric Using Epoxy Resin-Impregnated Aramid Non-Woven Fabric A sound absorbing fabric was prepared in the same manner as in Example 1 except that the surface-modified silica aerogel powder was not included in the impregnating solution with which the aramid non-woven fabric is impregnated. The impregnating solution used herein contained 8 wt % bisphenol A diglycidyl ether, 2 wt % bisphenol A diglycidyl ether polymer, 0.2 wt % dicyandiamide, 0.02 wt % dimethylurea, 10 wt % melamine cyanurate, and 79.78 wt % dimethyl carbonate.

Comparative Example 3. Preparation of Sound Absorbing Fabric Using Aramid Non-Woven Fabric The aramid non-woven fabric prepared in Example 1 was used as a sound absorbing fabric.

Comparative Example 4. Glass Fiber Mat (Felt)

E-Glass Fiber Needle Mat (EGNM) having a density of 300 g/m² and a thickness of 6 mm was prepared.

Experimental Example

The properties of the sound absorbing fabric prepared in Examples 1 and 2 and Comparative Examples 1 to 4 were measured by the following methods, and the results are shown in Tables 1 to 3 below.

Evaluation Method of Physical Properties (1) Evaluation of Heat Resistance

To evaluate heat resistance of the sound absorbing fabric, it was aged in an oven at 260° C. for 300 hours. After keeping at standard state (temperature 23±2° C., 50±5% relative humidity), appearance was inspected. At this time, the appearance was judged by visually checking whether there were shrinkage or deformation, surface peeling, fluffing, and cracking.

(2) Evaluation of Thermal Insulation Property

A sound absorbing fabric having a thickness of 20 mm was installed, and 350° C. heat was applied to a side of the sound absorbing fabric for 5 minutes and then the temperature was measured at the opposite side of the sound absorbing fabric.

(3) Evaluation of Formability

The formability of the sound absorbing fabric was confirmed by hot-pressing and cold-pressing. The hot-pressing was carried out under a pressure of 150 kgf/cm² for 200 seconds while maintaining a surface temperature of the hot mold at 200° C., and the cold-pressing was carried out for at least 10 seconds while maintaining a surface temperature of the cold mold at 30° C., and then the product was taken out and measured by a test method for confirming the appearance.

(4) Evaluation of Dispersibility

The dispersibility of the aerogels in the sound absorbing fabric was confirmed by phase separation phenomenon occurring when aerogels were added to the impregnating solution.

(5) Evaluation of Sound Absorbing Property

The sound absorbing property of the sound absorbing fabric was measured by the ISO 354 method.

According to the results of evaluation of thermal insulation property shown in Table 1 below, the temperature measured at the opposite side of the sound absorbing fabric is as follows. The sound absorbing fabric of Example 1 had a temperature of 95° C., the sound absorbing fabric of Comparative Example 1 had a temperature of 105° C., the sound absorbing fabric of Comparative Example 2 had a temperature of 118° C., and the aluminum heat plate of Comparative Example 3 had a temperature of 125° C. As a result, the sound absorbing fabric of the present invention has improved thermal insulation performance by being impregnating with the thermosetting resin and the aerogel powder.

TABLE 1

Characteristics of Sound-Absorbing Fabric

| Classification | | Example 1 | Comparative Example 1 | Comparative Example 2 | Comparative Example 3 |
|---|---|---|---|---|---|
| Composition of Sound-Absorbing Fabric | | Aramid Non-Woven Fabric Surface-Modified Silica Aerogel Powder Epoxy Binder Resin | Aramid Non-Woven Fabric Silica Aerogel Powder Epoxy Binder Resin | Aramid Non-Woven Fabric — Epoxy Binder Resin | Aramid Non-Woven Fabric — — |
| Physical properties | Heat Resistance | Excellent | Good | Good | Good |
| | Thermal Insulation | 95° C. | 105° C. | 118° C. | 125° C. |
| | Formability | Good | Bad | Good | Not Formable |
| Aerogel Dispersibility | | Good | Bad | — | — |

TABLE 2

Characteristics of Sound-Absorbing Fabric

| Classification | | Example 2 | comparative Example 4 |
|---|---|---|---|
| Composition of Sound-Absorbing Fabric | | E-Glass Fiber Needle Mat Surface-Modified Silica Aerogel Powder Epoxy Binder Resin | E-Glass Fiber Needle Mat — — |
| Physical properties | Heat Resistance | Excellent | Good |
| | Thermal Insulation | 95° C. | 128° C. |
| | Formability | Good | Not Formable |
| Aerogel Dispersibility | | Good | — |

TABLE 3

Sound Absorption Rate of Noise-Absorbent Fabric

| Frequency (Hz) | Example 1 | Comparative Example 1 | Comparative Example 2 | Comparative Example 3 |
|---|---|---|---|---|
| 400 | 0.07 | 0.08 | 0.07 | 0.08 |
| 500 | 0.12 | 0.11 | 0.11 | 0.12 |
| 630 | 0.18 | 0.12 | 0.16 | 0.17 |
| 800 | 0.25 | 0.22 | 0.25 | 0.25 |
| 1000 | 0.35 | 0.30 | 0.35 | 0.34 |
| 1250 | 0.42 | 0.46 | 0.46 | 0.45 |
| 1600 | 0.61 | 0.55 | 0.61 | 0.59 |
| 2000 | 0.73 | 0.60 | 0.72 | 0.70 |
| 2500 | 0.80 | 0.74 | 0.81 | 0.81 |
| 3150 | 0.85 | 0.80 | 0.84 | 0.82 |
| 4000 | 0.87 | 0.80 | 0.88 | 0.86 |
| 5000 | 0.98 | 0.90 | 0.99 | 0.98 |
| 6300 | 0.99 | 0.90 | 0.99 | 0.99 |
| 8000 | 0.99 | 0.88 | 0.99 | 0.98 |
| 10000 | 0.98 | 0.88 | 0.98 | 0.98 |

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A sound absorbing fabric with thermal insulation, the sound absorbing fabric comprising:
   a non-woven fabric comprising a heat-resistant fiber in an amount of about 30 to about 100% by weight;
   a silica aerogel powder having a surface modified by a surfactant; and
   a thermosetting binder resin,
   wherein the silica aerogel powder and the thermosetting binder resin are located in the same layer as the non-woven fabric, and maintain a three-dimensional structure inside the non-woven fabric.

2. The sound absorbing fabric of claim 1, wherein the sound absorbing fabric comprises about 0.1 to about 10 parts by weight of the silica aerogel powder and about 1 to about 60 parts by weight of the thermosetting binder resin, based on 100 parts by weight of the non-woven fabric.

3. The sound absorbing fabric of claim 1, wherein the surfactant is polyethylene glycol $C_{10-30}$ alkyl ester.

4. The sound absorbing fabric of claim 1, wherein the heat-resistant fiber has a limiting oxygen index (LOI) of equal to or greater than 25% and a heat resistance temperature of equal to or greater than 150° C.

5. The sound absorbing fabric of claim 4, wherein the heat-resistant fiber comprises one or more selected from a group consisting of aramid fiber, polyphenylene sulfide (PPS) fiber, oxidized polyacrylonitrile (OXI-PAN) fiber, polyimide (PI) fiber, polybenzimidazole (PBI) fiber, polybenzoxazole (PBO) fiber, polytetrafluoroethylene (PTFE) fiber, polyketone (PK) fiber, metal fiber, carbon fiber, glass fiber, basalt fiber, silica fiber, and ceramic fiber.

6. The sound absorbing fabric of claim 5, wherein the heat-resistant fiber is an aramid fiber.

7. The sound absorbing fabric of claim 1, wherein the non-woven fabric is a single-layer non-woven fabric having a thickness of about 3 to about 20 mm, and made of an aramid fiber having a fineness of about 1 to about 15 denier.

8. The sound absorbing fabric of claim 1, wherein the non-woven fabric has a density of about 100 to about 2000 g/m$^2$.

9. The sound absorbing fabric of claim 1, wherein the thermosetting binder resin is an epoxy resin.

10. The sound absorbing fabric of claim 9, wherein the epoxy resin comprises one or more selected from a group consisting of bisphenol A diglycidyl ether, bisphenol B diglycidyl ether, bisphenol AD diglycidyl ether, bisphenol F diglycidyl ether, bisphenol S diglycidyl ether, polyoxypropylene diglycidyl ether, bisphenol A diglycidyl ether polymer, phosphagen diglycidyl ether, bisphenol A novolac epoxy, phenol novolac epoxy resin, and o-cresol novolac epoxy resin.

11. The sound absorbing fabric of claim 1, wherein the sound absorbing fabric is formed into a shape corresponding to a three-dimensional shape of a desired subject.

12. The sound absorbing fabric of claim 1, wherein the sound absorbing fabric is composed of a single layer or multiple layers.

13. The sound absorbing fabric of claim 1, wherein the sound absorbing fabric is used for a vehicle.

14. A method of preparing a sound absorbing fabric with thermal insulation according to claim 1, the method comprising:
  step (a) of preparing an impregnating solution in which silica aerogel powder having surface modified by a surfactant and a thermosetting binder resin are mixed and dispersed;
  step (b) of immersing a non-woven fabric comprising a heat-resistant fiber in an amount of about 30 to 100% by weight in the impregnating solution; and
  step (c) of drying the immersed non-woven fabric.

15. The method of claim 14, wherein a sound absorbing fabric prepared in step (c) comprises about 0.1 to about 10 parts by weight of a silica aerogel powder having surface modified by a surfactant and about 1 to about 60 parts by weight of a thermosetting binder resin, based on 100 parts by weight of a non-woven fabric.

16. The method of claim 14, wherein the surfactant is polyethylene glycol $C_{10\text{-}30}$ alkyl ester.

17. The method of claim 14, further comprising:
  step (d) of preparing a sound absorbing fabric with thermal insulation by forming the dried non-woven fabric at high temperature, following step (c).

18. The method of claim 14, wherein the heat-resistant fiber has a limiting oxygen index (LOI) of equal to or greater than 25% and a heat resistance temperature of equal to or greater than 150° C.

19. The method of claim 14, wherein the heat-resistant fiber comprises one or more selected from a group consisting of aramid fiber, polyphenylene sulfide (PPS) fiber, oxidized polyacrylonitrile (OXI-PAN) fiber, polyimide (PI) fiber, polybenzimidazole (PBI) fiber, polybenzoxazole (PBO) fiber, polytetrafluoroethylene (PTFE) fiber, polyketone (PK) fiber, metal fiber, carbon fiber, glass fiber, basalt fiber, silica fiber, and ceramic fiber.

20. The method of claim 14, wherein the heat-resistant fiber is an aramid fiber having a fineness of about 1 to about 15 denier and a yarn length of about 20 to about 100 mm.

21. The method of claim 14, wherein the non-woven fabric has a thickness of 3 to 20 mm and a density of about 100 to about 2000 $g/m^2$.

22. The method of claim 14, further comprising:
  a step of preparing an aramid non-woven fabric having a thickness of about 3 to about 20 mm by needle punching of a heat-resistant aramid fiber having a fineness of about 1 to about 15 denier prior to step (a).

23. The method of claim 22, wherein the non-woven fabric is prepared by continuously up-down needling, down-up needling, and up-down needling.

24. The method of claim 22, wherein the non-woven fabric is prepared with a needle stroke of about 30 to about 350 times/$m^2$.

25. The method of claim 14, wherein the impregnating solution comprises a silica aerogel powder having surface modified by a surfactant in an amount of about 0.1 to about 10% by weight, a thermosetting binder resin in an amount of 1 to 60% by weight, a curing agent in an amount of about 0.1 to about 10% by weight, a catalyst in an amount of about 0.01 to about 5% by weight, an additive in an amount of about 1 to about 40% by weight, and a solvent in an amount of about 30 to about 95% by weight.

26. The method of claim 14, wherein the impregnating solution comprises a silica aerogel powder having surface modified by a surfactant in an amount of about 0.1 to about 5% by weight, a thermosetting binder resin in an amount of about 1 to about 30% by weight, a curing agent in an amount of about 0.1 to about 10% by weight, a catalyst in an amount of about 0.01 to about 5% by weight, a flame retardant in an amount of about 1 to about 30% by weight, and a solvent in an amount of about 40 to about 95% by weight.

27. The method of claim 14, wherein the thermosetting binder resin is an epoxy resin.

28. The method of claim 27, wherein the epoxy resin comprises one or more selected from a group consisting of bisphenol A diglycidyl ether, bisphenol B diglycidyl ether, bisphenol AD diglycidyl ether, bisphenol F diglycidyl ether, bisphenol S diglycidyl ether, polyoxypropylene diglycidyl ether, bisphenol A diglycidyl ether polymer, phosphagen diglycidyl ether, bisphenol A novolac epoxy, phenol novolac epoxy resin, and o-cresol novolac epoxy resin.

29. The method of claim 14, wherein the sound absorbing fabric is used for a vehicle.

30. A method of reducing noise of a noise-generating device and providing thermal insulation thereto, the method comprising:
  checking a three-dimensional shape of the noise-generating device;
  preparing and forming a sound absorbing fabric of claim 1 to have a shape partially or entirely corresponding to the three-dimensional shape of the device; and
  placing the sound absorbing fabric to be adjacent to the noise-generating device.

31. The method of claim 30, wherein the device is a motor, an engine, or an exhaust system.

32. The method of claim 30, wherein the sound absorbing fabric is adjacent to the noise-generating by being closely attached to the device, by being placed to the device while having a predetermined space therewith, or by being formed to be as a part of the device.

* * * * *